Patented Apr. 21, 1931

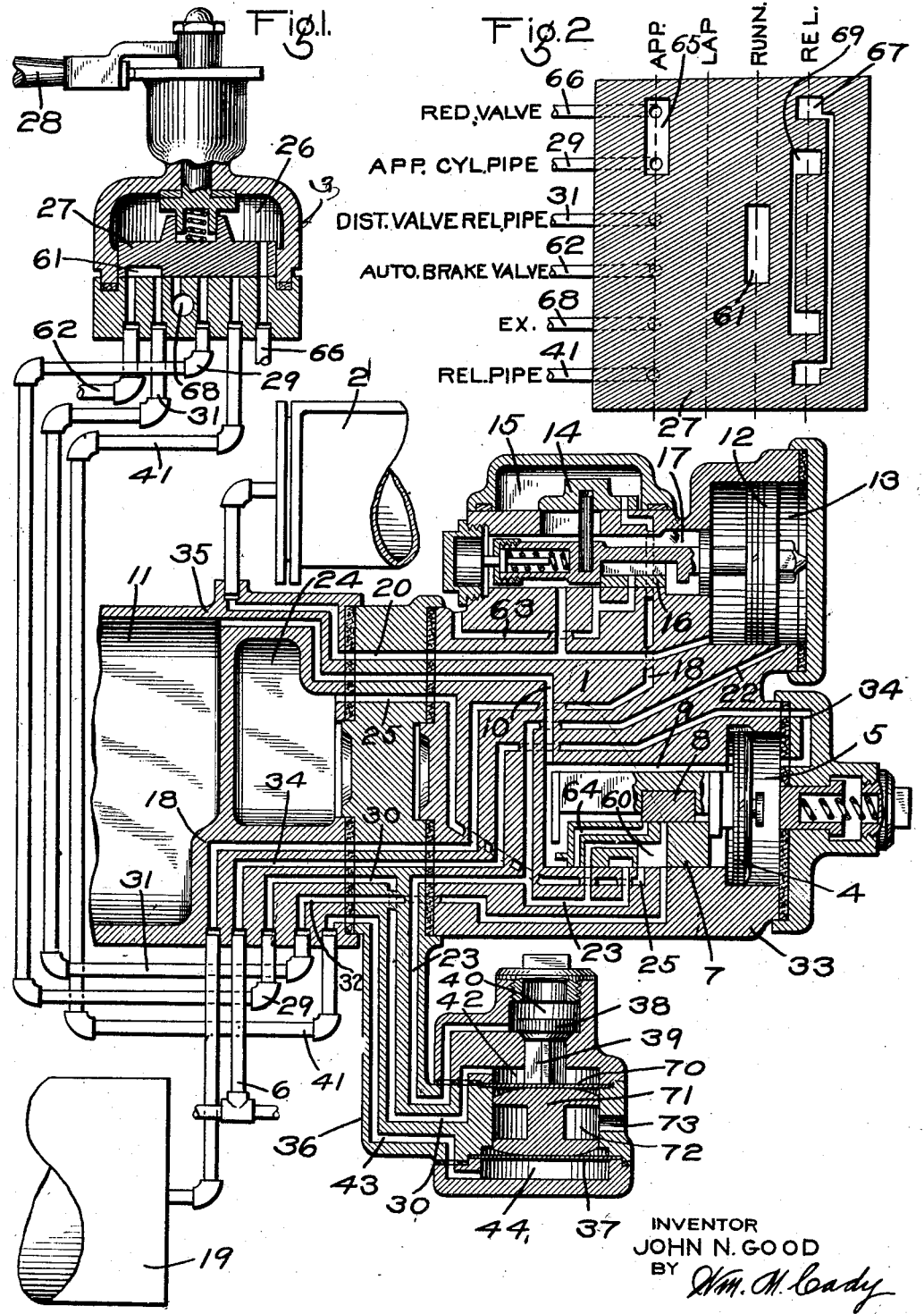

1,801,859

UNITED STATES PATENT OFFICE

JOHN N. GOOD, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID-PRESSURE BRAKE

Application filed July 2, 1929. Serial No. 375,433.

This invention relates to fluid pressure brakes, and more particularly to a locomotive brake apparatus for a fluid pressure brake equipment.

What is known as the E. T. locomotive brake equipment is extensively employed on railway systems and includes a distributing valve device, an automatic brake valve device, and an independent brake valve device.

The distributing valve device comprises an equalizing portion and an application and release portion. The application and release portion comprises valves for controlling the admission and release of fluid under pressure to and from the locomotive brake cylinders, and a piston operated by the pressure in an application cylinder for operating said valves.

The equalizing portion comprises valves for controlling the admission and release of fluid under pressure to and from the application cylinder, and a piston operated by variations in brake pipe pressure for operating said valves. An application cylinder pipe is connected to the application cylinder and leads to the independent brake valve, so that the brakes on the locomotive may be applied and released independently of the train brakes by manipulating the independent brake valve to supply fluid under pressure to and release fluid from the application cylinder pipe.

The automatic brake valve device is adapted to control the pressure in the brake pipe, to maintain the brake pipe charged with fluid under pressure, and to effect an application of the brake by reducing the brake pipe pressure.

A distributing valve release pipe is also provided, which is connected through a cavity in the rotary valve of the independent brake valve with the automatic brake valve device. Said release pipe is connected through a cavity in the slide valve of the equalizing valve device, when in release position, with the application cylinder, so that fluid may be released from the application cylinder to release the locomotive brakes, when the automatic brake valve is turned from release to running position.

When an automatic application of the brakes is effected by operation of the equalizing valve device, fluid under pressure is supplied from the usual pressure chamber to the application cylinder and the pressure also equalizes into the application cylinder pipe. Equalization into the application cylinder pipe tends to reduce the pressure of fluid obtained in the application cylinder, and this reduction is more pronounced, the greater the length of the application cylinder pipe.

If the application cylinder pipe should become cracked or broken, it will be impossible to apply or hold the brakes applied on the locomotive, as will be evident.

The principal object of my invention is to provide means for preventing the equalization of fluid pressure from the application cylinder into the application cylinder pipe.

In the accompanying drawing; Figure 1 is a diagrammatic view, partly in section, of a locomotive brake equipment embodying my invention; and Fig. 2 a diagram, showing the different operating positions of the rotary valve of the independent brake valve device.

Only so much of a locomotive brake equipment is shown in the drawing as deemed necessary to a clear understanding of the invention. The apparatus shown includes a distributing valve device 1, a brake cylinder 2, and an independent brake valve device 3, the independent brake valve device being associated with the usual automatic brake valve device (not shown).

The distributing valve device comprises an equalizing valve device and an application and release valve device. The equalizing valve device comprises a piston 4, contained in piston chamber 5, which is connected to the usual brake pipe 6, through a passage 34, and a main slide valve 7 and a graduating slide valve 8, contained in valve chamber 9, and adapted to be operated by piston 4, the valve chamber 9 being connected, through a passage 10, with a pressure chamber 11.

The application and release valve device comprises a piston 12, contained in application cylinder 13, a supply valve 14, contained in valve chamber 15, and a release valve 16, contained in valve chamber 17, said valves being operable by piston 12. The valve chamber 15 is connected, through passage 18 with the usual main reservoir 19, and the valve chamber 17 is connected, through passage 20 with the brake cylinder 2.

The application cylinder 13 is connected, through a passage 22, with a passage 23, which leads to the seat of slide valve 7. An application chamber 24 is connected to a passage 25, which leads to the seat of slide valve 7.

The independent brake valve device 3 comprises a casing having a valve chamber 26, containing a rotary valve 27, adapted to be operated by a handle 28. An application cylinder pipe 29 leads to the seat of the rotary valve 27 and is connected to a passage 30 in the distributing valve casing. A distributing valve release pipe 31 also leads to the seat of the rotary valve 27 and is connected to a passage 32 in the distributing valve casing.

The equalizing valve device and the application and release valve device are associated in a casing section 33, and the pressure chamber 11 and the application chamber 24 are associated in a casing section 35. Said casing sections are clamped on opposite sides of a casing section 36. In the casing section 36 is disposed an application cylinder cut-off valve device, comprising a movable abutment including a flexible diaphragm 37 and a flexible diaphragm 70, adapted to operate a check valve 38 having a stem 39.

Passage 23 is connected to valve chamber 40, containing valve 38, and passage 43, leading to an additional release pipe 41, is connected to chamber 44, below the diaphragm 37. The diaphragm 37 is spaced from a flexible diaphragm 70 by a follower member 71 and the chamber 72 intermediate said diaphragms is open to the atmosphere through a port 73. The valve stem 39 adapted to engage the diaphragm 70 and the area of the diaphragm 37 is greater than that of the diaphragm 70.

In operation, when the brake pipe 6 is charged with fluid under pressure, fluid flows through the usual feed groove around the equalizing piston 4 and charges the valve chamber 9 and the pressure chamber 11, to the pressure carried in the brake pipe.

In the release position of the equalizing valve device, the application cylinder 13 is connected, through passage 22, passage 23, and cavity 60 in slide valve 7, with passage 32 and the distributing valve release pipe 31.

In the normal running position of the independent brake valve, the pipe 31 is connected, through a cavity 61 with a pipe 62, which leads to the seat of the rotary valve of the automatic brake valve device (not shown). In the normal running position of the automatic brake valve device, the pipe 62 and therefore the distributing valve release pipe 31 are connected to the atmosphere.

With the application cylinder 13 at atmospheric pressure, as above described, the piston 12 is maintained in release position, in which the release valve 16 connects valve chamber 17 and consequently the brake cylinder 2, with the atmosphere, through passage 63.

An automatic service application of the brakes is effected by operation of the automatic brake valve device, so as to cause a service reduction in brake pipe pressure. Upon reducing the brake pipe pressure, the equalizing piston 4 moves to the right, first causing the graduating valve 8 to move and uncover the service port 64 and then the main slide valve 7 is moved to bring port 64 into registry with passage 23.

Fluid under pressure is then supplied from valve chamber 9 and the pressure chamber 11 to the application cylinder 13, so that the piston 12 is shifted inwardly to cause the release valve 16 to close the exhaust from the brake cylinder and the supply valve to open communication from valve chamber 15 and the main reservoir 19, to the valve chamber 17 and the brake cylinder. Fluid under pressure is then supplied to the brake cylinder, to effect an application of the brakes.

It will now be noted that the check valve 38 prevents flow of fluid from the application cylinder 13 to the application cylinder pipe 29, so that fluid under pressure supplied to the application cylinder, by operation of the equalizing valve device, cannot equalize into the application cylinder pipe. Thus the pressure in the application cylinder is not reduced in effecting an automatic application of the brakes, by flow to the application cylinder pipe.

Furthermore, if the application cylinder pipe should break, the check valve 38 prevents loss of fluid from the application cylinder, by flow to the broken application cylinder pipe.

In order to release the brakes, the brake pipe pressure in increased, by operation of the automatic brake valve device and thereby the equalizing piston 4 is shifted to release position and the slide valve 7 is moved to release position, in which the application cylinder 13 is connected, through passage 23 and cavity 60 in slide valve 7, with passage 32, which is connected to the distributing valve release pipe 31. The independent brake valve device being in running position as shown in Fig. 1, and the automatic brake valve device being in running position, fluid under pressure in the application cylinder is vented to the atmosphere.

Upon release of fluid under pressure from the application cylinder 13, piston 12 is moved to release position, in which the release valve 16 again connects the brake cylinder 2 with the atmosphere, through passage 63, so as to effect the release of the brakes.

In order to effect an independent application of the brakes on the locomotive, the independent brake valve handle 28 is turned to application position, in which a cavity 65 in the rotary valve 27 connects the application cylinder pipe 29 with a pipe 66, which is connected to a reducing valve device (not shown) adapted to supply fluid at a reduced pressure from the main reservoir.

Fluid under pressure is thus supplied to the application cylinder pipe 29 and flows through passage 30 to chamber 42 at the upper face of diaphragm 70. The check valve 38 is then lifted to permit flow of fluid to passage 23 and thence to passage 22 and the application cylinder 13. The piston 12 is then shifted to actuate the valves 14 and 16, as in an automatic application of the brakes, hereinbefore described, so as to effect the supply of fluid under pressure to the brake cylinder.

To effect the independent release of the brakes, the independent brake valve handle is turned to release position, in which the application cylinder pipe 29 is connected, through a cavity 69 in the rotary valve 27, with exhaust port 68. Release of fluid from the application cylinder 13 is, however, prevented (as so far described) by the check valve 38.

In order to permit release of fluid under pressure from the application cylinder in effecting an independent release of the brakes, the rotary valve 27 is provided with a cavity 67, which is adapted in the release position of the rotary valve, to connect the additional release pipe 41 with the reducing valve pipe 66, so that fluid under pressure is supplied to said pipe and thence through passage 43 to diaphragm chamber 44. The diaphragm 37 is then deflected upwardly and causes a corresponding movement of the follower 71 and the diaphragm 70, so that the check valve 38 is unseated.

The unseating of check valve 38 permits flow of fluid from the application cylinder 13, through passage 23 to passage 30 and thence to the application cylinder pipe 29 and the pipe 29 being connected to the atmosphere in the release position of the independent brake valve, fluid under pressure is released from the application cylinder so as to effect the independent release of the brakes.

The area of the diaphragm 37 is greater than that of diaphragm 70, so that even if the fluid pressure acting on the valve 38 and in chamber 42 should be high, the full opening of the valve 38 will be assured, when fluid pressure is supplied to the diaphragm chamber 44, due to the greater area of the diaphragm 37, which is exposed to fluid pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, of a valve device operated by variations in fluid pressure for controlling the supply of fluid under pressure to the brake cylinder and having a passage through which fluid under pressure is supplied to operate said valve device, a check valve for preventing back flow from said valve device to said passage, a release pipe, and a movable abutment having differential areas and subject to the opposing pressures in said passage and said release pipe for operating said valve.

2. In a fluid pressure brake, the combination with a brake cylinder, of a valve device operated by variations in fluid pressure for controlling the supply of fluid under pressure to the brake cylinder and having a passage through which fluid under pressure is supplied to operate said valve device, a check valve for preventing back flow from said valve device to said passage, a release pipe, and spaced flexible diaphragms having different areas for operating said valve, the diaphragm having the larger area being subject to the pressure of fluid in said release pipe and the other diaphragm being subject to the pressure of fluid in said passage.

3. In a locomotive brake equipment, the combination with a brake cylinder, of a valve device operated by variations in fluid pressure for controlling the brake cylinder pressure, a release pipe through which fluid under pressure is released from said valve device, a check valve for preventing back flow of fluid from said valve device, an additional pipe, and means operated by fluid under pressure supplied to said additional pipe for opening said check valve.

4. In a locomotive brake equipment, the combination with a brake cylinder, of a valve device operated by variations in fluid pressure for controlling the supply and release of fluid under pressure to and from the brake cylinder and having an application cylinder, an application cylinder pipe through which fluid is supplied to said application cylinder, a check valve for preventing back flow from said cylinder to said pipe, a release pipe through which fluid under pressure is released from said cylinder, means operated by fluid under pressure for opening said check valve, and an additional pipe for supplying fluid under pressure to said means.

5. In a locomotive brake equipment, the combination with a brake cylinder, of a valve device operated by variations in fluid pressure for controlling the supply and release of fluid under pressure to and from the brake cylinder and having an application cylinder, an application cylinder pipe through which fluid is supplied to said application cylinder, a check valve for preventing back flow from said cylinder to said pipe, a release pipe through which fluid under pressure is released from said cylinder, means operated by fluid under pressure for opening said check valve, an additional pipe, and a brake valve device for supplying fluid under pressure through said additional pipe to said means.

6. In a locomotive brake equipment, the combination with a brake cylinder, of valve means for controlling the admission and release of fluid under pressure to and from the brake cylinder, a piston operated by variations in fluid pressure in an application cylinder for operating said valve means, an application cylinder pipe through which fluid under pressure is supplied to said cylinder, a check valve for normally preventing back flow from said cylinder to said pipe, means operated by an increase in fluid pressure for opening said valve, a release pipe through which fluid is released from said cylinder, an additional pipe, and a brake valve device for supplying fluid under pressure through said additional pipe to said means.

In testimony whereof I have hereunto set my hand, this 29th day of June, 1929.

JOHN N. GOOD.